G. H. GIBSON.
WATER HEATING APPARATUS.
APPLICATION FILED SEPT. 7, 1909. RENEWED JULY 22, 1911.
1,002,144.
Patented Aug. 29, 1911.
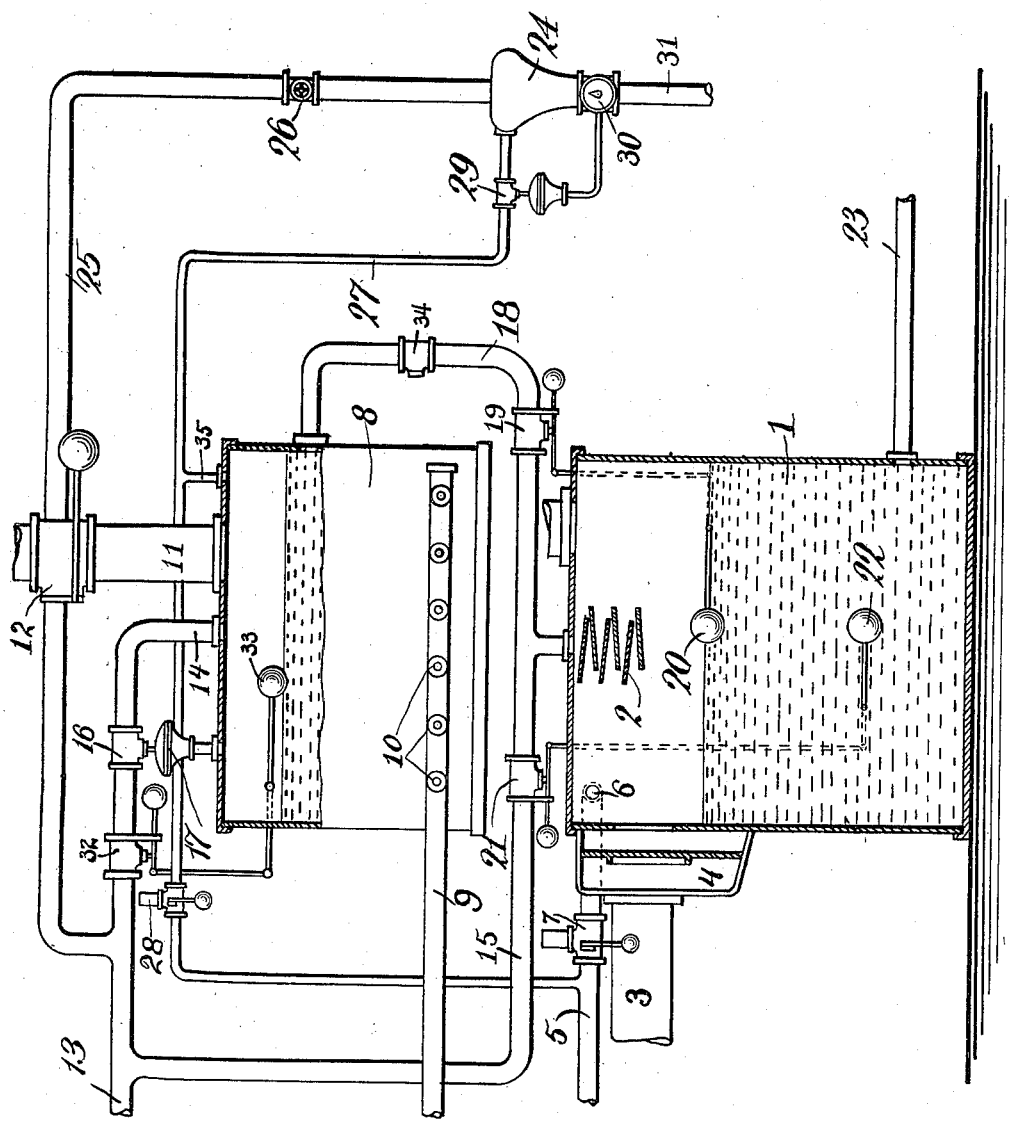
WITNESSES:
INVENTOR
George H. Gibson
BY
ATTORNEYS

UNITED STATES PATENT OFFICE.

GEORGE H. GIBSON, OF MONTCLAIR, NEW JERSEY, ASSIGNOR TO HARRISON SAFETY BOILER WORKS, OF PHILADELPHIA, PENNSYLVANIA.

WATER-HEATING APPARATUS.

1,002,144. Specification of Letters Patent. Patented Aug. 29, 1911.

Application filed September 7, 1909, Serial No. 516,462. Renewed July 22, 1911. Serial No. 640,015.

*To all whom it may concern:*

Be it known that I, GEORGE H. GIBSON, a citizen of the United States, residing at Montclair, county of Essex, State of New Jersey, have invented certain new and useful Improvements in Water-Heating Apparatus, of which the following is a specification.

This invention relates to apparatus for heating water which is to be used in the boiler of a locomotive or other steam engine and its object is to provide an apparatus of this character which is simple in construction, which permits of economical operation by the utilization of heat contained in exhaust steam and which may be constructed at comparatively low cost.

The apparatus constructed in accordance with the invention is of particular utility in connection with the supply of water in railroad roundhouses for washing and filling the boilers of the locomotives. For this purpose it is desirable that a supply of water be maintained at a temperature of 212° F. so that the least possible time will be consumed in putting a locomotive in condition for service.

In accordance with the invention an apparatus is provided with which such a supply of water may be maintained and with which the heat units in exhaust steam and in steam blown off from a locomotive, in emptying the latter, can be utilized for heating the filling water for the locomotives. The water blown off from a locomotive is not used for this purpose since it contains impurities rendering it unsuitable for further use, but the steam in the blow-off of a locomotive is separated from the water and utilized as a heating medium. This steam is utilized in one tank to raise the temperature of water in that tank and the amount of this water will of course vary in accordance with the number of locomotives whose steam is discharged therein. A second tank is also provided having therein means for heating the water utilizing for this purpose exhaust steam from stationary engines and other apparatus which may be in use at the plant. The water admitted to this second tank is drawn from the first tank and is therefore water which has been partially heated or heated to 212° F., but if ever the supply of water in the first tank is reduced below the outlet opening and the level of the water in the second one falls to a predetermined point, water will be automatically admitted to the second tank from a suitable source of water supply, preferably without passing through the first tank.

The invention also contemplates the provision of a source of supply of live steam to the tank or heater containing the filling water and means whereby this live steam connection is automatically opened when steam is required in the heater and the supply of exhaust steam is insufficient. In this way a supply of filling water, at the desired temperature, is constantly maintained and this supply is replenished by water drawn from a second supply heated by steam blown off from a locomotive; and in case this second supply is not available, the supply of filling water will be replenished by water drawn from a cold water main. In combination with these devices, means are provided for supplying washing water at a temperature of approximately 130° F, by the employment of a heater to which steam and cold water are admitted, the amount of steam admitted being automatically regulated so as to raise the temperature of the water to the desired point.

I have illustrated the preferred embodiment of my invention in the accompanying drawings which show the apparatus employed diagrammatically.

Referring to this drawing, a water heater is shown at 1, this having a chamber in the bottom thereof of a size sufficient to store a substantial quantity of water for filling locomotive boilers. The heater may be of any suitable construction as for instance one employing means for spraying water into steam but the form I have illustrated is that employing one or more series of trays 2 over which the water admitted to the heater flows while steam is rising through the trays so that the steam will be condensed by the water and the water will take up the heat units in the steam. The steam is admitted to a heater through a pipe 3 and if desired an oil separator 4 may be inserted in the connection between pipe 3 and heater 1. The pipe 3 is designed to carry exhaust steam to the heater 1 from stationary engines and other apparatus which may be in use at the plant; as this supply of exhaust steam may not be at all times sufficient to heat water admitted to heater 1 to a temperature of 212° F., I have provided an additional steam supply pipe 5 connected to the heater 1 at 6 and arranged to carry live steam to the heater from any suitable source. It is desired that the passageway through live steam pipe 5 be opened only when an insufficient supply of steam is carried to the heater by the pipe 3 and I therefore provide a pressure-reducing valve 7 in the pipe 5 which will open and close automatically in response to changes of pressure within the heater.

A second water heater and storage tank is shown at 8, this tank being of any suitable construction and so arranged that steam may be admitted thereto in order to heat the water contained in the tank. In the drawing I have shown a pipe 9 running along the side of the tank 8 at the bottom thereof, and a plurality of connections 10 whereby steam passing through the pipe 9 may be carried to the interior of the tank 8, within which it will rise through the water in the tank and impart its heat to the water. The pipe 9 is arranged for connection to the boiler of a locomotive so as to receive the steam blown off from the boiler in emptying it, a separator being provided in order to permit the steam to enter pipe 9 and preclude the blow-off water from passing through the pipe. The heater and storage tank 8 is provided with an exhaust pipe 11 having a relief valve 12 therein so as to relieve against excessive pressure within tank 8.

A cold water supply main is shown at 13, this being connected to the heater 8 by pipe 14 and to the heater 1 by pipe 15. In the pipe 14 for carrying cold water to the heater 8 is a valve 16 operated by a diaphragm within a casing 17, this casing being in communication with the interior of tank 8 so that valve 16 will operate in direct response to changes of pressure within tank 8.

A pipe 18 connects the heater 8 with the heater 1 and in this pipe is a valve 19 operated by a float 20 within the heater 1. In the pipe 15 connecting the cold water supply pipe with the heater 1 is a valve 21 operated by float 22 within the heater 1, the float 22 being at a substantial distance below the float 20. Water for filling the boiler of a locomotive may be drawn from the heater 1 through the pipe 23.

A heater for heating cold water to a temperature which will make it suitable for use as washing water is shown at 24, this being connected to the cold water supply pipe 13 by a pipe 25 and the latter having a hand-operated valve 26 therein. Steam is carried to the heater 24 from the live steam pipe 5 by a pipe 27 and in this pipe is a pressure-reducing valve 28. In the pipe 27 is a second valve 29 operated by a thermostat 30 which projects into the heater 24 or the pipe 31 leading therefrom. This thermostatically controlled valve is so arranged that it operates in direct response to the temperature of the water flowing through the heater 24 and is set so that it will permit so much steam to be supplied to heater 24 by pipe 27 as is necessary to heat the water passing through the heater 24 to the desired point.

A valve 32 is provided in the pipe 14 for carrying cold water to the tank 8, additional to the valve 16, its function being to cut off the supply when tank 8 has been filled to a predetermined level; for this purpose valve 32 is arranged to be operated by a float 33 in the tank 8 connected to the valve by suitable links.

If desired, the steam pipe 27 for carrying steam to the heater 24 may be connected to the tank 8 as shown at 35, so as to draw steam for the heater 24 from the tank 8 if there is steam available in that tank. The pipe 18 is preferably connected to the tank 8 at a point considerably above the bottom of the tank so that there will be a supply of water in tank 8 at all times from which steam may be drawn into the heater 24 if the temperature of this water has not fallen too low. I have also shown a check-valve 34 in pipe 18 to prevent steam from passing from tank 1 through pipe 18 to tank 8 when valve 19 is open and no water is passing through pipe 18.

The operation of the apparatus as thus constructed will now be described. Cold water is supplied to the heaters 8 and 1 by pipe 13, the water passing into the tank 8 whenever the pressure within that tank is sufficient to open the valve 16 and float 33 has opened valve 32; the steam creating this pressure is supplied to heater 8 by pipe 9 and consists of steam blown off from a locomotive; this steam rises through the water in heater 8 and imparts its heat thereto so that this water is economically heated by employing for this purpose blow-off steam. Under normal conditions, the valve 21 is maintained closed by the float 22 and therefore water will not pass from the cold water supply pipe through the pipe 15 to the heater 1. The normal level of the water in heater 1 is that shown in the drawing and if the level falls below this, float 20 will open the valve 19 so as to permit heated water to pass from the heater 8 through the pipe 18 to the heater 1. If at any time the level of the water in heater 1 falls so as to open valve 19 and the water in heater 8 is below the entrance of pipe 18 into tank 8, the supply of water in heater 1 will not be replenished, and, on further use, the level will fall until finally the float 22 is operated. This opens the valve 21 and cold water is admitted from the supply pipe 13 to the heater 1. The float 22 is located a substantial distance below the float 20 and the level of the water normally varies between these two floats; the water normally supplied to the heater 1 is the heated water drawn from the heater 8, but if ever the supply of heated water from heater 8 fails and sufficient water is drawn from heater 1 to reduce the level beyond the normal range, the float 22 will be operated to admit cold water to the heater 1. The water stored in the heater is always maintained at a temperature of 212° F. and this heating of the water will be effected by the exhaust steam if the latter is sufficient in quantity and temperature to effect this; but if ever the supply of exhaust steam is insufficient for this purpose, steam will be admitted to the heater 1 from the source of supply of live steam, the pressure of this steam being suitably reduced by the pressure-reducing valve 7.

When it is desired to wash a boiler the valve 26 may be turned on so as to admit cold water to the heater 24 and the passage of this water through the heater will cause steam to be drawn from the heater 8 or the live-steam pipe 5 through the pipe 27 to the heater 24 in sufficient quantity to raise the temperature of the water passing through the heater 24 to that which is desired.

Having described my invention, what I claim as new therein and desire to secure by Letters Patent is:

1. The combination of a water heater, means for supplying steam and water thereto, a second water heater, means for supplying steam thereto, a connection between said heaters, means operated automatically when the level of the water in the second heater falls to a predetermined point for opening said connection, and means operated automatically when the level of the water in the second heater falls to a lower point for supplying water to the second heater from a source other than the first heater, substantially as set forth.

2. The combination of a water heater, a steam connection thereto, means within the heater for employing steam to heat water admitted to the heater, two floats in the heater, a hot water tank connected to the heater, a cold water supply pipe connected to the heater, both said tank and said pipe being adapted to supply water to the heater to be heated by said means, means operated by the upper of said floats for controlling the passage of water from said tank to the heater, and means operated by the lower of said floats for controlling the passage of water from said cold water supply to the heater, substantially as set forth.

3. The combination of a water heater, means for supplying steam thereto, a water supply pipe connected to the heater, a second heater, means for supplying steam thereto, a pipe connecting said heaters, a valve in said pipe, a float in said second heater adapted to operate said valve, a second float in said second heater and at a lower level than said float, and means operated by the last-named float for automatically controlling the admission of water to the second heater from a source other than the first heater, substantially as set forth.

4. The combination of a water heater, means for supplying steam thereto, a water supply pipe connected to the heater, a second heater, a pipe for carrying exhaust steam to the second heater, a live steam pipe connected to the second heater, a pressure-reducing valve therein, means operated automatically when the level of the water in the second heater falls to a predetermined point for permitting the passage of water from the first heater to the second, and means operated automatically when the level of the water in the second heater falls to a lower point for permitting the passage of water from the supply pipe to the second heater, substantially as set forth.

5. The combination of a water heater, means for supplying steam thereto, a water supply pipe connected to the heater, a valve in said pipe operated in response to changes of conditions within said heater, a second water heater, means for supplying steam thereto, means operated automatically when the level of the water in the second heater falls to a predetermined point for permitting the passage of water from the first heater to the second, and means operated automatically when the level of the water in the second heater falls to a lower point for permitting the passage of water from the supply pipe to the second heater, substantially as set forth.

6. The combination of a water heater, means for supplying steam thereto, a water supply pipe connected to the heater, a valve in said pipe operated in response to changes of conditions within said heater, a second water heater, means for supplying steam thereto, a pipe connecting said heaters, a valve in said pipe, a float in the second heater operating said valve, a pipe connecting the water supply pipe to the second heater, a valve in said pipe, a float in said second heater at a lower level than said float operating said valve, and a pipe for withdrawing the water from the second heater, substantially as set forth.

This specification signed and witnessed this 20th day of August, 1909.

GEORGE H. GIBSON.

Witnesses:
 D. S. EDMONDS,
 J. A. YOUNG.

Copies of this patent may be obtained for five cents each, by addressing the "Commissioner of Patents, Washington, D. C."